US008688161B2

(12) United States Patent
Kies et al.

(10) Patent No.: US 8,688,161 B2
(45) Date of Patent: Apr. 1, 2014

(54) SYSTEM AND METHOD FOR CREATING AN AD HOC GROUP IN A PUSH-TO-TALK SYSTEM

(75) Inventors: Jonathan K. Kies, Encinitas, CA (US); Jason B. Kenagy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1866 days.

(21) Appl. No.: 11/360,960

(22) Filed: Feb. 22, 2006

(65) Prior Publication Data

US 2007/0197250 A1    Aug. 23, 2007

(51) Int. Cl.
*H04B 7/00* (2006.01)
(52) U.S. Cl.
USPC ........... 455/518; 455/517; 455/519; 455/520; 455/416; 709/204; 709/205; 709/206
(58) Field of Classification Search
USPC ................ 455/416, 517–520; 709/204–206
See application file for complete search history.

(56) References Cited

U.S. PATENT DOCUMENTS

| 6,253,091 | B1 | 6/2001 | Naddell et al. |
| 2003/0153341 | A1 | 8/2003 | Crockett et al. |
| 2005/0143135 | A1* | 6/2005 | Brems et al. .................. 455/564 |
| 2006/0121926 | A1 | 6/2006 | Joung |
| 2007/0016828 | A1* | 1/2007 | Luo et al. ........................ 714/38 |
| 2007/0115925 | A1* | 5/2007 | Sachnoff ........................ 370/352 |
| 2008/0049921 | A1* | 2/2008 | Davis et al. .............. 379/202.01 |

FOREIGN PATENT DOCUMENTS

| EP | 1069749 | 1/2001 |
| WO | 2004086715 | 10/2004 |
| WO | 2004114643 | 12/2004 |

OTHER PUBLICATIONS

International Search Report—PCT/US07/062522, International Search Authority—European Patent Office—Nov. 2, 2007.
OMA Open Mobile Alliance: "Push to talk over Celular (PoC)—Alliance Draft Version 1.0 Open Mobile Alliance OMA-AD_PoC-V1_0-20041117-D" Internet Citation, [Online] Nov. 17, 2004, XP002372965, p. 48, Paragraphs 9.2.1, 9.2.1.1.
Written Opinion—PCT/US2007/062522, International Search Authority, European Patent Office,Nov. 2, 2007.

* cited by examiner

*Primary Examiner* — Fayyaz Alam
(74) *Attorney, Agent, or Firm* — Raphael Freiwirth

(57) ABSTRACT

A system and method for creating an ad hoc communications group in a push-to-talk (PTT) system. A user may create an ad hoc group for a PTT communications by selecting members from different sources in a wireless communications device. The user may select members from a caller identification list, a recent call list, or a contact list. The ad hoc communications group thus composed is sent to a server and the server will then set up a PTT communications among the members of this ad hoc group.

26 Claims, 6 Drawing Sheets

SYSTEM AND METHOD FOR CREATING AN AD HOC GROUP IN A PUSH-TO-TALK SYSTEM

BACKGROUND OF THE INVENTION

1. Field of the Invention

The present invention generally relates to wireless telecommunications, and more specifically, relates to a system and method for creating an ad hoc group in a push-to-talk system on a wireless network.

2. Description of the Related Art

Technology advancement has made mobile telephones or wireless communications devices cheap and affordable to almost everyone. As the wireless telephones are manufactured with greater processing ability and storage, they also become more versatile and incorporate many features including the direct radio communication capability between two or more individual handsets. This direct radio communication capability is commonly known as the push-to-talk (PTT) or "walkie-talkie" feature that allows a user with one handset to communicate with a predefined set of members of a group without dialing a destination telephone number.

In a PTT system, a handset uses one single frequency for both upward and downward communications with a remote server, while in a normal wireless communication a wireless telephone uses two frequencies for communicating with the server, one for upward and one for downward communications. The PTT system requires the person who is speaking to press a button while talking and then release it when he is done. Any listener in the group can then presses their button to respond. In this manner, the system can determine in which direction the signal should be traveling. When a user makes a call to a receiving party or a group of receiving parties using the PTT system, the user's handset first makes a request to a remote server. The remote server verifies that no other party is using the communication channel and the channel is available then assigns the channel to the user. The user's message is received by the server and the server duplicates the message for each and every receiving party. After the message is transmitted to every receiving party, the channel is released and ready for use by other parties.

The PTT system relies on cellular technology to connect to the recipient devices. Conversely, a normal "walkie-talkie" style two-way radio will only operate if the radios are within a certain distance of each other. Systems using the PTT feature can communicate anywhere within a service area specified by its service provider, typically a large urban area or even nationally.

Generally, in a communication through the PTT feature one user broadcasts his messages to a plurality of members in his predefined PTT communication group and the message is broadcasted only to the members of this predefined PTT communication group. The user cannot create a new PTT group "on the fly" by selecting members with whom he has recently communicated.

SUMMARY OF THE INVENTION

The system and method according to the invention enables a user to create an ad hoc PTT group in a push-to-talk system. A user may create an ad hoc PTT group by selecting members from his contact list or a recent call list. He may also include as a member people in the caller identification list. After he created the ad hoc group, his wireless device sends this ad hoc group to a remote server before he places a PTT call to the ad hoc group.

In one embodiment, the invention is a method for creating an ad hoc group on a wireless device for a push-to-talk communications on a wireless telecommunication network. The method includes the steps of displaying at least one predefined list, receiving a selection of a select contact information, composing the ad hoc group with the select contact information, and transmitting information on the ad hoc group to a server. The predefined list resides on the wireless device and includes a plurality of contact information.

In another embodiment, the invention is a method for making a push-to-talk (PTT) call to a group in a push-to-talk communication system. The method includes the steps for receiving a push-to-talk request through a push-to-talk communication channel from a wireless device, receiving group information from the wireless device, establishing a PTT group based on the group information, receiving PTT audio data from the wireless device, and distributing the PTT audio data to a plurality of members listed in the PTT group. The group information includes identification information on the plurality of members.

In yet another embodiment, the invention is an apparatus for creating an ad hoc group on a wireless device for a push-to-talk communications on a wireless telecommunication network. The apparatus includes a transceiver for transmitting and receiving push-to-talk communications from a remote server, a storage unit for receiving storing information on the ad hoc group, a display unit for displaying a plurality of predefined lists of members, a user interface unit for receiving a selection of members from the plurality of predefined list, a push-to-talk interface for receiving a push-to-talk request from the user, and a controller for assembling the ad hoc group based on the selection of members and transmitting information on the ad hoc group to the remote server.

In yet another embodiment, the invention further includes a system for forming an ad hoc group for a push-to-talk communication in a wireless communications network. The system includes a server in communication with the wireless communication network, and a plurality of wireless communication devices capable of communicating with the server through the wireless communications network. The server is capable of receiving information of an ad hoc group and establishing the ad hoc group for a push-to-talk communication, and each wireless communication device capable of displays a plurality of predefined lists. Each wireless communication device forms the ad hoc group and transmitting information of the ad hoc group to the server through the wireless communications network.

The present system and methods are therefore advantageous as they enable creation of an ad hoc PTT group by a user and the user may easily create the ad hoc PTT group by selecting members from different sources in his wireless communications device.

Other advantages and features of the present invention will become apparent after review of the hereinafter set forth Brief Description of the Drawings, Detailed Description of the Invention, and the Claims.

DETAILED DESCRIPTION OF THE INVENTION

In this description, the terms "communication device," "wireless device," "wireless communications device," "wireless handset," "handheld device," and "handset" are used interchangeably, the term "application" as used herein is intended to encompass executable and nonexecutable software files, raw data, aggregated data, patches, and other code segments. Further, like numerals refer to like elements throughout the several views, and the articles "a" and "the" includes plural references, unless otherwise specified in the description.

In overview, the system and method of the invention enables a user to create an ad hoc PTT group in a push-to-talk system. A user may create the ad hoc PTT group by using different sources in a wireless communications device. He may include as a member people in a caller identification list, a contact list, or a recent call list. After he created the ad hoc group, his wireless device sends this ad hoc group to a remote server before he places a PTT call to the ad hoc group.

Figure 1:
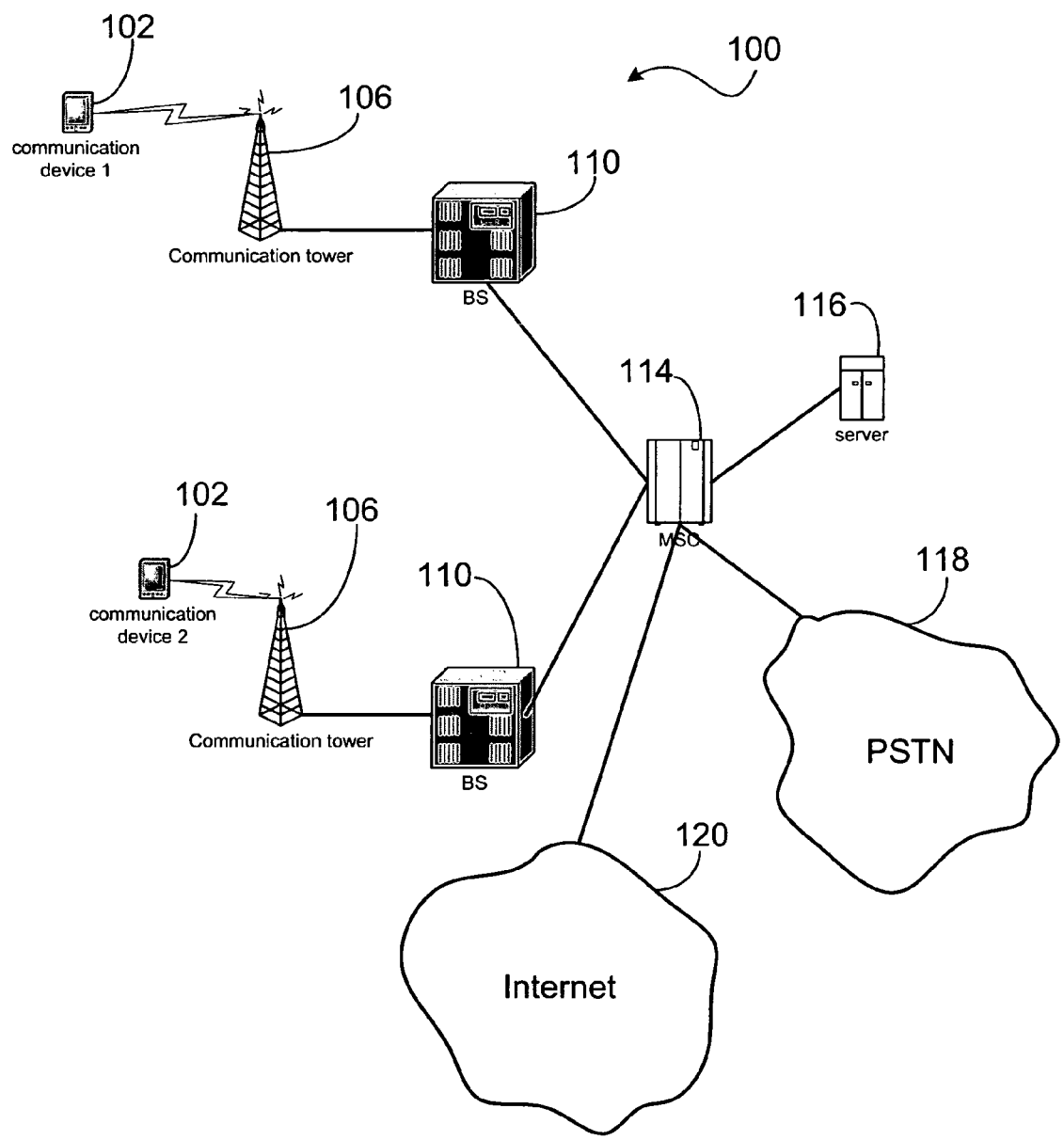
FIG. 1 is a wireless network architecture that supports the creation of an ad hoc group for a push-to-talk communication.

FIG. 1 depicts a communication network 100 used according to the present invention. The communication network 100 includes one or more communication towers 106, each connected to a base station (BS) 110 and serving users with communication device 102. The communication device 102 can be cellular telephones, pagers, personal digital assistants (PDAs), laptop computers, or other hand-held, stationary, or portable communication devices that supports push-to-talk (PTT) communications. The commands and data input by each user are transmitted as digital data to a communication tower 106. The communication between a user using a communication device 102 and the communication tower 106 can be based on different technologies, such code division multiplexed access (CDMA), time division multiplexed access (TDMA), frequency division multiplexed access (FDMA), the global system for mobile communications (GSM), or other protocols that may be used in a wireless communications network or a data communications network. The data from each user is sent from the communication tower 106 to a base station (BS) 110, and forwarded to a mobile switching center (MSC) 114, which may be connected to a public switched telephone network (PSTN) 118 and the Internet 120. The MSC 114 may be connected to a server 116 that supports the PTT feature in the communications network 100. The server 116 includes an application that supports the PTT feature and is capable of setting an ad hoc PTT communications group and establishing a PTT communication among members of the ad hoc PTT communications group. Optionally, the server 116 may be part of the MSC 114.

Figure 2:
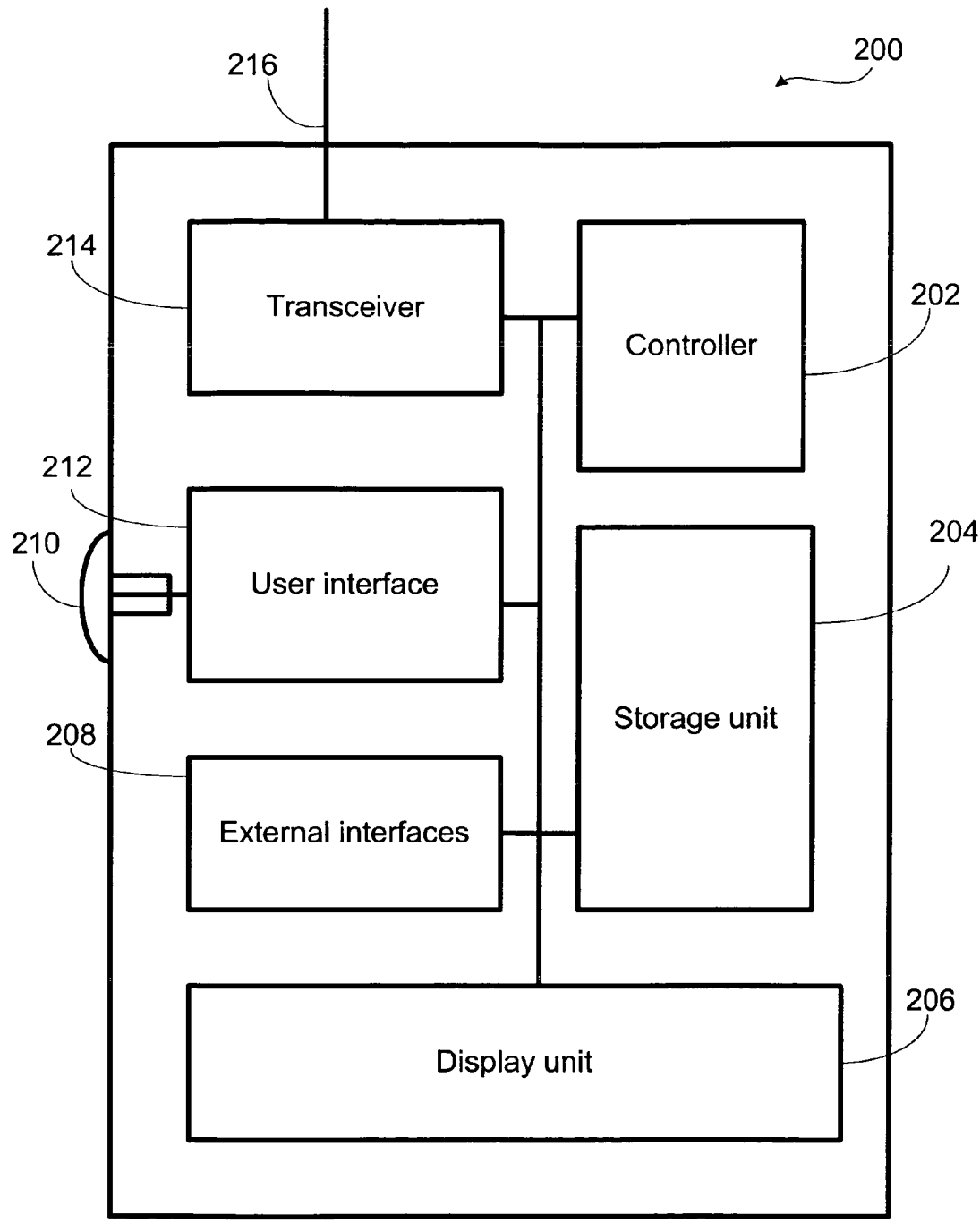
FIG. 2 is a block diagram of a wireless device that supports the creation of an ad hoc group for a push-to-talk communication.

FIG. 2 illustrates a block diagram 200 of a wireless handset 102. The wireless handset 102 includes a controller 202, a storage unit 204, a display unit 206, an external interface unit 208, a user interface unit 212, a push-to-talk activation unit 210, a transceiver 214, and an antenna 216. The controller 202 can be hardware, software, or a combination thereof. The controller 202 is capable of receiving information about an ad hoc PTT communications group created by a user and provides PTT communication among users in this ad hoc PTT communications group. The storage unit 204 may store a plurality of PTT communications groups, wherein each PTT communications group includes a list of members. The display unit 206 may display graphical images or other digital information to the user. The external interface unit 208 controls hardware, such as speaker, microphone, and display unit, used for communication with the user. The user interface unit 212 controls hardware, such as keypad and push-to-talk activation unit 210. The transceiver 214 transmits and receives radio signals to and from a communication tower 106. The controller 202 interprets commands and data received from the user and the communication network 100.

Figure 3:
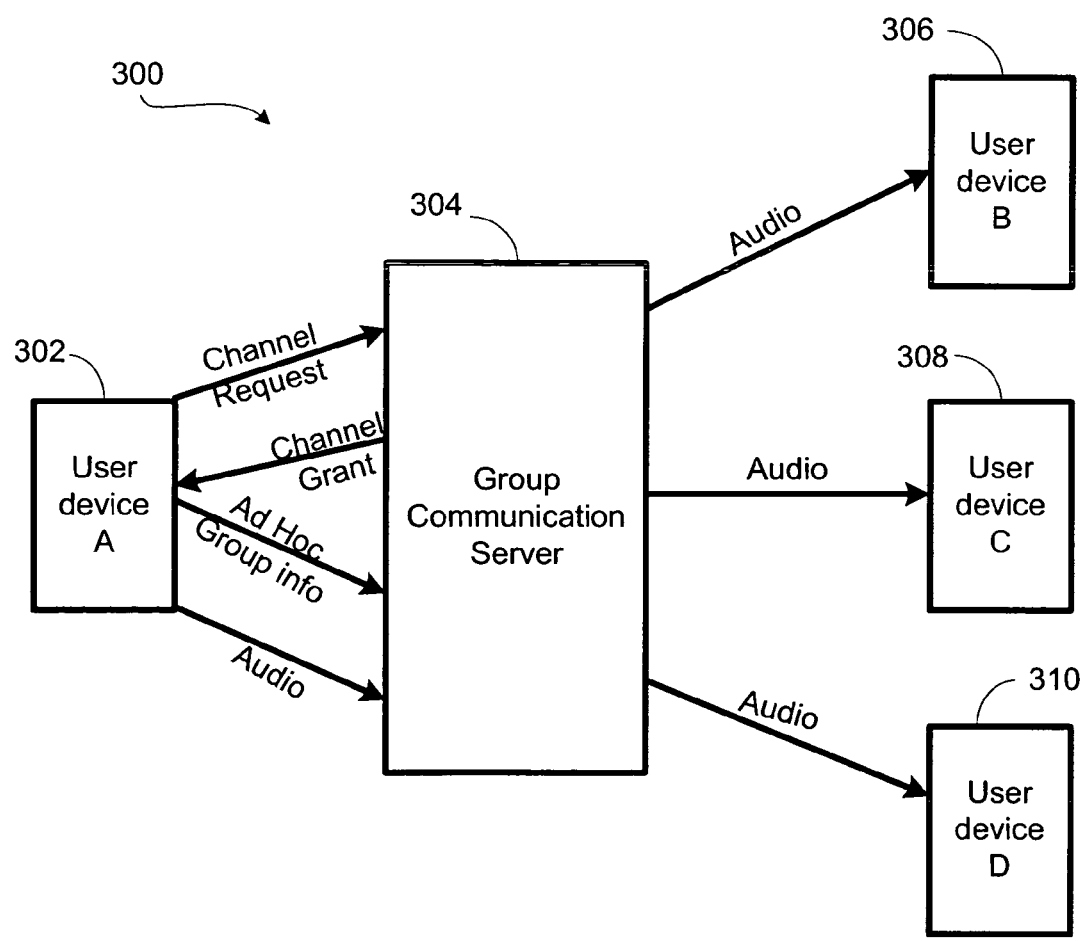
FIG. 3 is a diagram representing interactions between a server and remote wireless devices.

FIG. 3 is a diagram 300 representing interactions between the server (also known as group communication server) and user devices during a PTT communication process. A communication does not occur between an initiating user device 302 and a server 304 until a user activates a PTT button. Generally, the user may start a PTT communication with members of predefined PTT groups. However, a user may also create an ad hoc PTT communications group before starting a PTT communication. The wireless device sends a PTT communication channel request to the server 304. Upon receiving the PTT communication channel request, the server 304 checks the availability of the PTT communication channel, and grants the PTT communication channel to the initiating user device 302 if the PTT communication channel is available. After the use of the PTT communication channel is granted to the initiating user device 302, and the initiating wireless device 302 sends the ad hoc PTT communications group information to the server 304. The wireless device 302 then receives and sends user audio to the server 302. Upon receiving the user audio and the ad hoc group information, the server 304 identifies the members 306-310 of the PTT communication group that the initiating user device 302 wants to send the audio message. The server 304 also replicates the audio message and image code and sends them to each member 306-310 of the PTT communication group.

Figure 4:
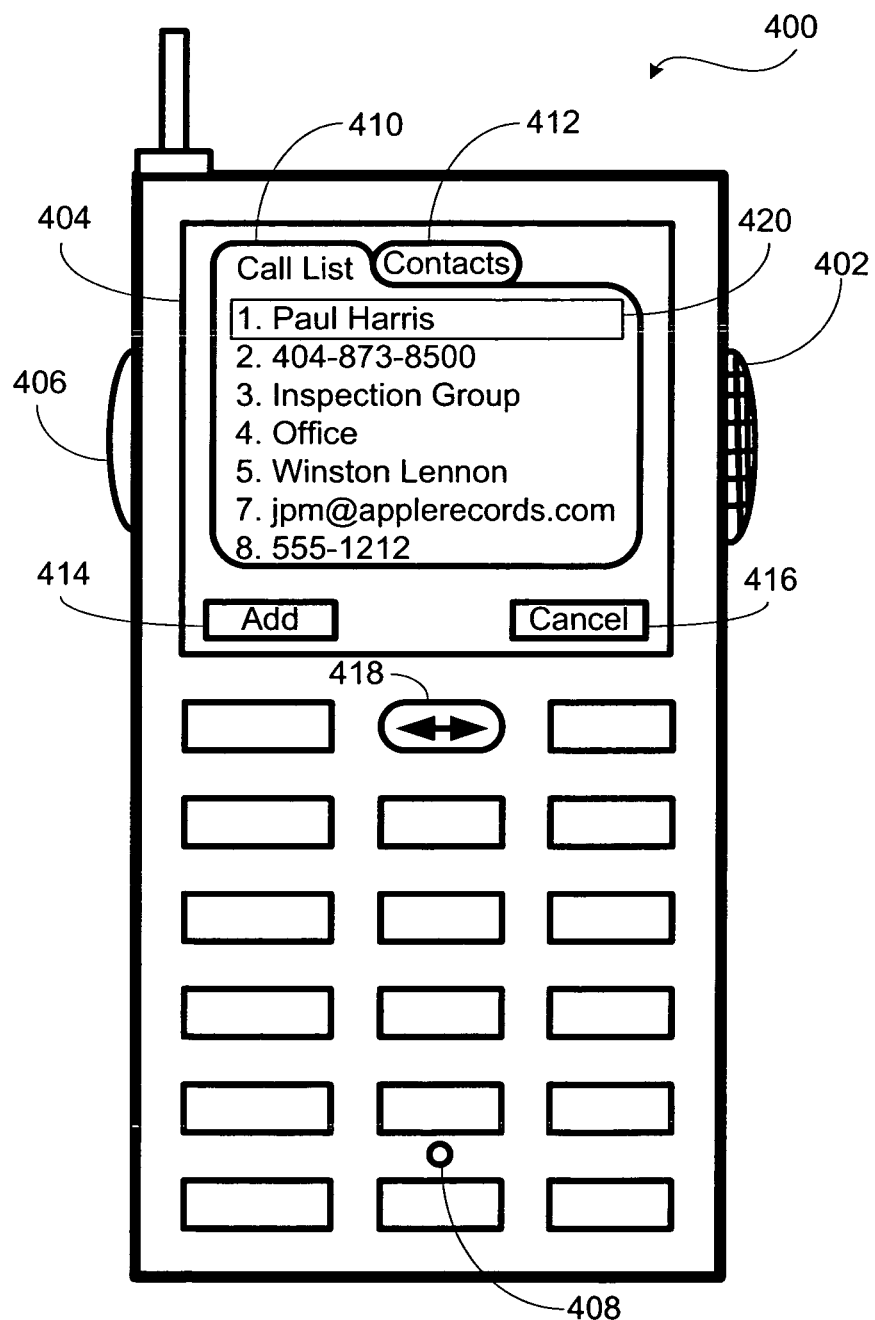
FIG. 4 is an illustration of a wireless device displaying a call list during a procedure to create an ad hoc group.

FIG. 4 illustrates a wireless communication device 400 displaying a call list 410. A user may start a PTT communication by activating the PTT button 406. The user's audio is captured by the microphone 408 and transmitted to a server, and the audio received from the server is played to the user through the speaker 402. Generally, the PTT communication is directed to a predefined PTT group. However, the user may use the wireless communication device 400 according to the invention to create an ad hoc PTT communication group. The user may select members for this ad hoc PTT group from different lists that are available in his wireless communication device 400. For example, the user may select a member from a recent call list 410 or a contact list 412. The user starts the operation to form an ad hoc PTT group and selects the recent call list 410. The recent call list 410 is displayed on the display screen 404 and identification of recent callers is listed. The user may scroll up and down the list by using a scroll key 418 or other assigned keys. The selected name is highlighted and the user may add the selected name into the ad hoc group by activating an "ADD" button 414 on the touch screen. The user may also move to a different list to select a next member. The selected members in each list are highlighted persistently until the operation to create the ad hoc group is finished. The user may also remove a member from the ad hoc group using a "CANCEL" button 416 on the touch screen. Those skilled in the art will appreciate use of other keys to navigate between different screens and perform different functions.

Figure 5:
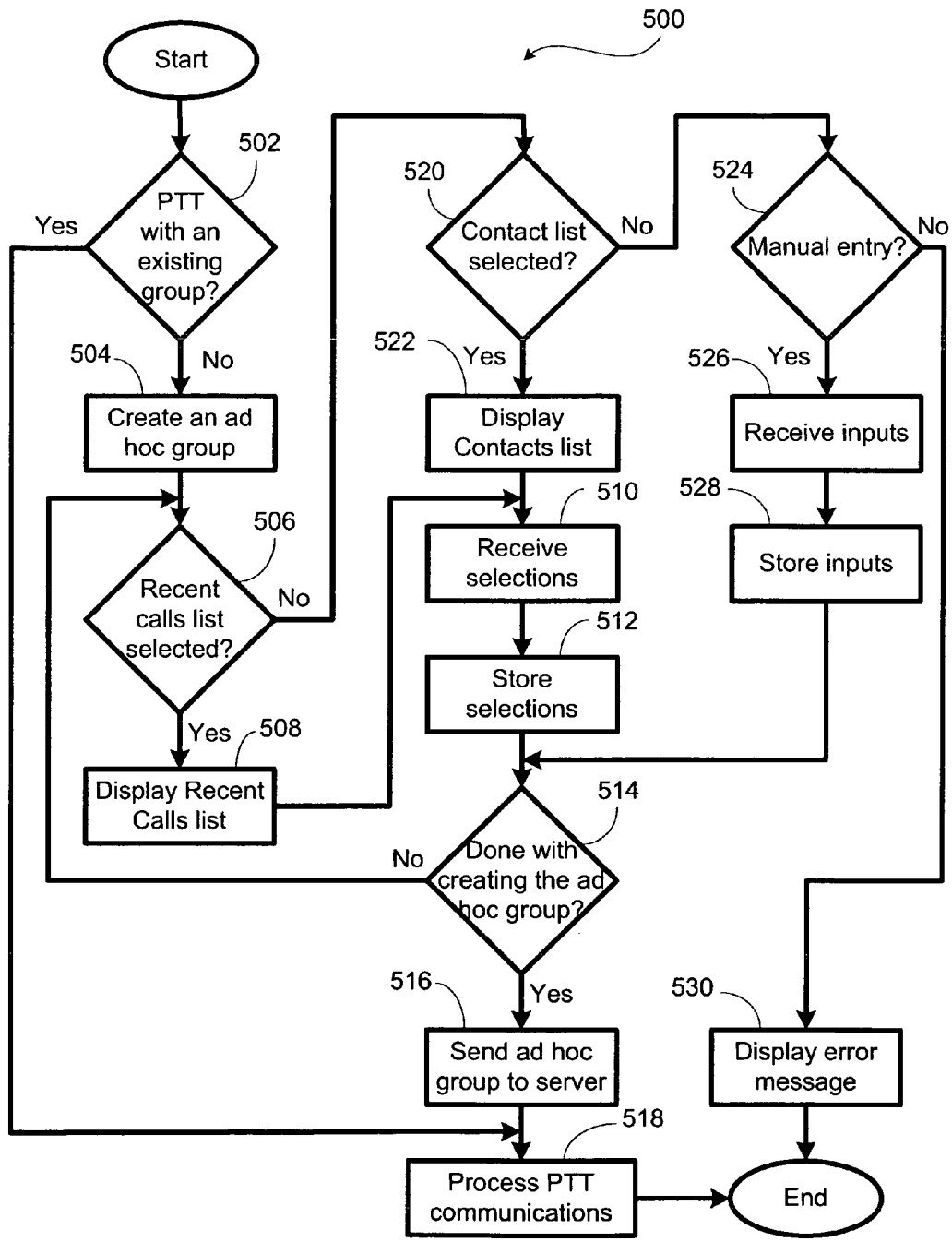
FIG. 5 is a flow chart for an ad hoc creation procedure in a wireless device.

FIG. 5 is a flow chart for a wireless device process 500. When a user wants to communicate with a group of his acquaintances, the user may use the PTT feature of his wireless device. The wireless device receives a PTT communication request, and checks whether it is directed toward a predefined PTT communications group, step 502. The user may be part of a predefined PTT group and this predefined PTT group is set up and stored in the server. If the PTT communication is directed to the predefined PTT group, the wireless device processes the PTT communication, step 518, by receiving audio data and transmitting the audio to the server. If the PTT communication is not directed to the predefined PTT group, then the wireless device will prompt the user to create an ad hoc PTT group, step 504.

The user may compose the ad hoc PTT group by selecting members from different sources. The user may select the members from a recent call list, a contact list, or a caller identification list. The recent call list lists the telephone numbers of the calls recently made by the user. The contact list lists the telephone numbers of the user's friends and family members. The caller identification list lists the telephone numbers of the calls recently received by the user. The caller may also manually enter telephone numbers of the members he wants to include in the ad hoc PTT group.

The wireless device displays a menu listing different sources for the user to select. After the user makes a selection, the wireless device checks the selection. If the user selects the recent call list, step 506, then the wireless device displays the recent call list on the display screen, step 508. The user then may make selections and the selections are received by the wireless device, step 510. The wireless device stores the selection, step 512, and checks whether the user is done with creation of the ad hoc group, step 514. If the user finished the creation of the ad hoc group, the wireless device sends the ad hoc PTT group to the server, step 516, and proceeds to process PTT communications, step 518.

If the user selects the contact list, step 520, then the wireless device displays the contact list on the display screen, step 522. The contact list includes names and contact information of the user's acquaintances. After the user makes a selection from this list, the selection is received and stored by the wireless device as described above. Though not shown in FIG. 5, the user may also select members from the caller identification list in a manner similar to the above description. The user may also include a previously used ad hoc PTT group as a member of the new ad hoc PTT group. Finally, the user has the option of manually entering the telephone number, step 524. The telephone number or other contact information entered by the user is received and processed in a manner similar as described above for other lists.

Figure 6:
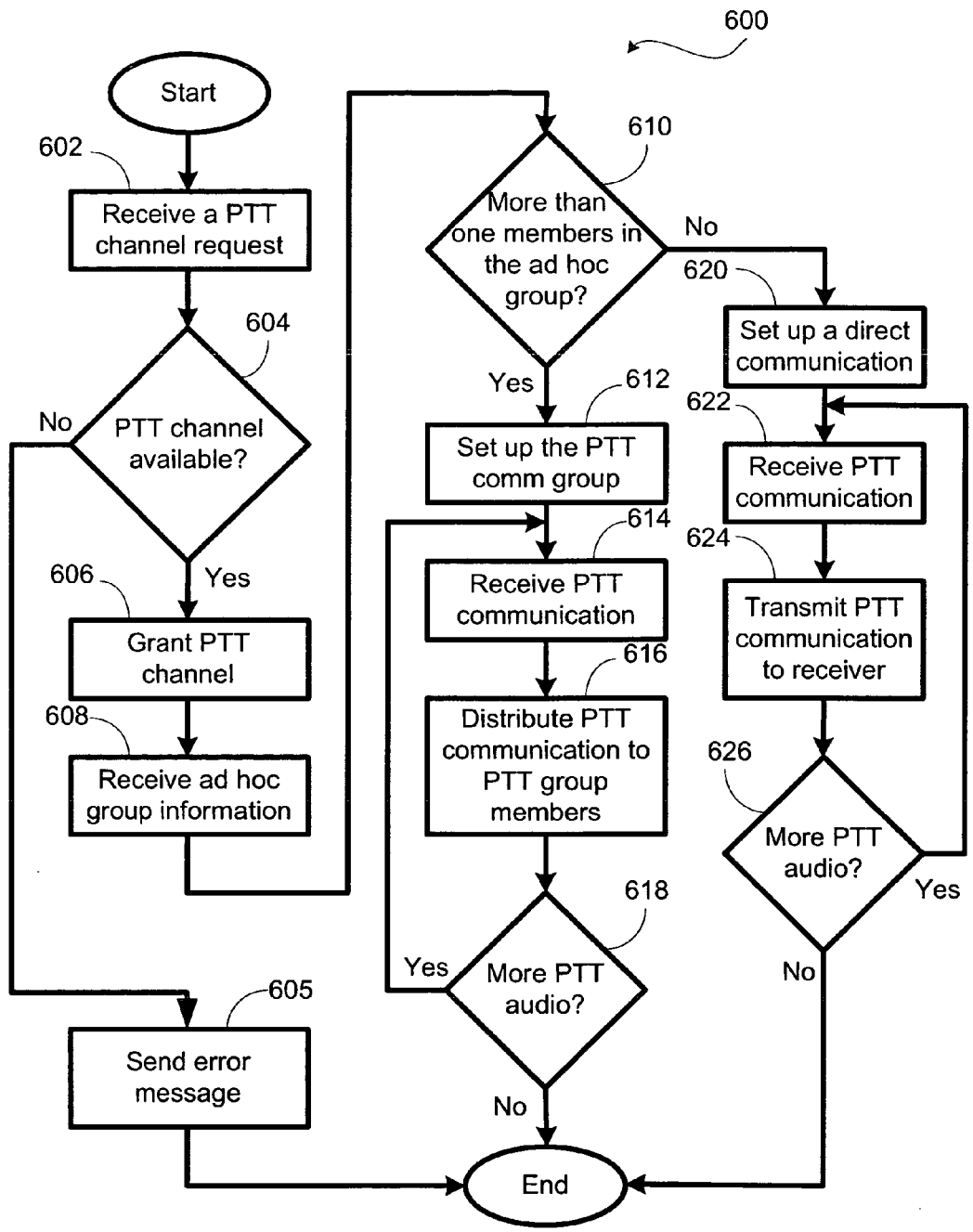
FIG. 6 is a flow chart for a server process.

FIG. 6 is a flow chart for a server process 600. The server 116 receives a PTT communication request, step 602, and checks whether a PTT channel is available, step 604. If there is no available PTT channel, the server 116 sends an error message to the requesting wireless device 102. If a PTT channel is available, the server 116 grants the channel to the requesting wireless device 102, step 606. After granting the PTT channel, the wireless device 102 will send and the server 116 will receive the ad hoc PTT group information, step 608. The server 116 checks whether there are more than one group member in the ad hoc PTT group, step 610. For PTT communications between two wireless devices, i.e., between one requesting wireless device and one receiving wireless device, the communication can be set as a point-to-point PTT communication, thus saving system resources. If the ad hoc PTT group has only one member, a direct PTT communication is set up between these two wireless devices, step 620. Though a direct PTT communication is set up, the server 116 still performs the task of receiving PTT communications from one wireless device 102, step 622, and transmitting the PTT communications to the receiving wireless device 102, step 624. After each transmission, the server 116 checks whether there is additional PTT communication, step 626. The server 116 repeats steps 622, 624, 626 until there is no more PTT communications between the two wireless devices 102.

If the ad hoc PTT group has more than one member, then the server 116 sets up a PTT communication group, step 612. The server 116 receives PTT audio data from the wireless device 102, step 614, duplicates it and distributes it to each member in the ad hoc PTT group, step 616. After transmitting the PTT audio data, the server 116 checks whether there is any addition PTT audio from any member in the ad hoc PTT group, step 618. If there is follow up communications, the server 116 proceeds to receive and distribute the PTT audio data as previously described. When there is no more PTT audio communication among members of this ad hoc PTT group, the server 116 may remove the ad hoc PTT group. In an alternative embodiment, the server 116 may keep the ad hoc PTT group and only remove it when the resource is needed by the server 116.

The following is a description of one use scenario according to one embodiment of the invention. When a building general contractor at a building material store wants to communicate with his workers at a construction site to learn the material that he should purchase and at the same time communicate with the architect of the building about the type of material, he can use the PTT feature of his wireless device to communicate with all the parties at the same time. However, the contractor must set up an ad hoc PTT group first. He selects "creating an ad hoc PTT group" feature on his wireless device. The wireless device prompts the contractor to choose a source where he can select a member. The contractor selects a recent call list, because he just placed a call to a roofer at the construction site. The wireless device displays the recent call list and the roofer is on the list. The contractor uses a scroll key to select the roofer and uses an "ADD" key to include the roofer in the ad hoc PTT group.

After selecting the first party, the contractor is prompted whether he wants to add another party. The contractor indicates he wants to add a second party from a caller identification list because the architect called him few minutes ago. The caller identification list lists all the calls received by the wireless device and each call received is associated with an origination telephone number. The originating telephone number is delivered to the wireless device by the caller identification feature of a public telephone switch network (PSTN). Again the contractor uses the scroll key to select the architect from the caller identification list and adds him into the ad hoc PTT group.

After adding the architect, the contractor realized that he should talk to the plumber at the construction site instead of the roofer. The contractor moves from the caller identification list back to the call list. The roofer's entry is still highlighted indicating the roofer has been selected. The contractor moves the cursor to the roofer and uses "CANCEL" command to remove the roofer from the ad hoc PTT group. After being removed, the roofer's entry is no longer highlighted. The contractor then can select the contact list where the plumber is listed. After the contact list is displayed, the contractor uses the scroll key to select the plumber's entry and adds the plumber to the ad hoc PTT group.

After the ad hoc PTT group is created, the contractor activates the PTT button and indicates that he wants to make a PTT communications to the members in the ad hoc PTT group. The server receives the PTT request and checks whether there is a PTT channel available. If a PTT channel is available, the server assigns the PTT channel to the contractor's wireless device. The wireless device then sends the information on the ad hoc PTT group to the server. Because there is more than one member in the ad hoc PTT group, the server sets up the ad hoc PTT group with wireless devices belonging to all three participants. When a PTT audio data is received from any participant, the server duplicates it and distributes it to other two participants.

In view of the method being executable on a wireless service provider's computer device or a wireless communications device, the method can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIGS. 5-6, the method may be implemented, for example, by operating portion(s) of the wireless network, such as a wireless communications device or the server, to execute a sequence of machine-readable instructions. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated.

What is claimed is:

1. A method for creating an ad hoc group on a wireless device for push-to-talk (PTT) communications on a wireless telecommunication network, comprising:
    displaying a menu listing a plurality of predefined lists, wherein each predefined list represents a contact information source separately residing on the wireless device and includes a plurality of entries that are selectable to create the ad hoc group, and wherein the plurality of predefined lists includes at least a user contact list and a caller identification list;
    receiving a user's selection of entries from the plurality of predefined lists, including at least one entry from the user contact list and at least one entry from the caller identification list, wherein:
        receiving the user's selection of the at least one entry from the user contact list comprises:
            receiving user input selecting the user contact list from the displayed menu; and
            accessing a first storage location in the wireless device to display the user's saved contact entries in response to receiving the user input selecting the user contact list; and
        receiving the user's selection of the at least one entry from the caller identification list comprises:
            receiving user input selecting the caller identification list from the displayed menu; and
            accessing a second storage location in the wireless device to display received call entries in response to receiving the user input selecting the caller identification list, wherein each received call entry includes at least an originating telephone number;
    composing the ad hoc group by combining the selected entries from the plurality of predefined lists; and
    transmitting information on the ad hoc group to a server.

2. The method of claim 1, wherein transmitting information on the ad hoc group to a server comprises transmitting the information to the server via a PTT communication channel.

3. The method of claim 1, wherein at least one of the plurality of predefined lists comprises contact information for members of a predefined PTT group.

4. The method of claim 1, wherein at least one of the plurality of predefined lists is a recent call list, wherein the recent call list comprises outgoing calls previously made by the user.

5. The method of claim 1, wherein the at least one selected entry from the user contact list comprises contact information including a telephone number.

6. The method of claim 1, wherein the at least one selected entry from the user contact list comprises contact information including an Internet protocol address.

7. The method of claim 1, wherein the at least one selected entry from the user contact list comprises contact information including an electronic mailing address.

8. A method for making a push-to-talk (PTT) call to a group in a PTT communication system, comprising:
    receiving a PTT request from a wireless device, the PTT request received at a server through a PTT communication channel;
    receiving group information defining a PTT group from the wireless device, wherein the group information identifies entries selected from a plurality of predefined lists separately residing on the wireless device, and wherein the plurality of predefined lists includes:
        a user contact list comprising contact information entries saved by a user in a first storage location of the wireless device; and
        a caller identification list comprising received call entries in a second storage location of the wireless device, wherein each received call entry includes at least an originating telephone number;
    establishing the PTT group based on the received group information, wherein the received group information identifies at least one entry selected from the user contact list and at least one entry selected from the caller identification list;
    receiving PTT audio data from the wireless device; and
    distributing the PTT audio data to a plurality of members in the PTT group, wherein the plurality of members correspond to the selected entries identified by the received group information.

9. The method of claim 8, wherein the contact information entries of the user contact list include telephone numbers.

10. The method of claim 8, wherein the contact information entries of the user contact list include electronic mailing addresses.

11. An apparatus for creating an ad hoc group on a wireless device for push-to-talk (PTT) communications on a wireless telecommunication network, comprising:

a transceiver for transmitting and receiving the PTT communications to and from a remote server;

a storage unit for receiving and storing information on the ad hoc group;

a display unit;

a user interface unit; and a processor coupled to the transceiver, the storage unit, the display unit, and the user interface unit, wherein the processor is configured with processor-executable instructions to perform operations comprising:

receiving user input requesting a PTT communication;

displaying a menu listing a plurality of predefined lists, wherein each predefined list represents a contact information source separately residing on the wireless device and includes a plurality of entries that are selectable to assemble the ad hoc group, wherein the plurality of predefined lists includes at least a user contacts list and a caller identification list;

receiving a user's selection of entries from the plurality of predefined lists, including at least one entry from the user contact list and at least one entry from the caller identification list, wherein:

receiving the user's selection of the at least one entry from the user contact list comprises:

receiving user input selecting the user contact list from the displayed menu; and accessing a first storage location in the wireless device to display the user's saved contact entries in response to receiving the user input selecting the user contact list; and receiving the user's selection of the at least one entry from the caller identification list comprises:

receiving user input selecting the caller identification list from the displayed menu; and accessing a second storage location in the wireless device to display received call entries in response to receiving the user input selecting the caller identification list, wherein each received call entry includes at least an originating telephone number;

assembling the ad hoc group based on the entries selected from the plurality of predefined lists; and transmitting information on the ad hoc group to the remote server.

12. The apparatus of claim 11, wherein the processor is configured with processor-executable instructions to perform operations further comprising:

displaying on the display unit each of the plurality of predefined lists with an associated tab; and switching from a first predefined list to a second predefined list when a tab associated with the second predefined list is activated.

13. The apparatus of claim 11, wherein the processor is configured with processor-executable instructions to perform operations further comprising:

highlighting a first entry in a currently displayed predefined list; and highlighting a second entry in the currently displayed predefined list in response to detecting that a navigation button is activated.

14. The apparatus of claim 13, wherein the processor is configured with processor-executable instructions to perform operations further comprising:

detecting activation of an add button;

identifying which entry in the currently displayed predefined list is highlighted on the display unit; and adding the identified entry to the ad hoc group in response to detecting activation of the add button.

15. The apparatus of claim 13, wherein the processor is configured with processor-executable instructions to perform operations further comprising:

detecting activation of a remove button;

identifying which entry in the currently displayed predefined list is highlighted on the display unit; and removing the identified entry from the ad hoc group in response to detecting activation of the remove button.

16. An apparatus for creating an ad hoc group on a wireless device for push-to-talk (PTT) communications on a wireless telecommunication network, comprising:

means for transmitting and receiving PTT communications to and from a remote server;

means for displaying a menu listing a plurality of predefined lists, wherein each predefined list represents a contact information source separately residing on the wireless device and includes a plurality of entries that can be selected to create the ad hoc group, wherein the plurality of predefined lists includes at least a user contact list and a caller identification list;

means for receiving a user's selection of entries from the plurality of predefined lists, including at least one entry from the user contacts list and at least one contact entry from the caller identification list, wherein:

means for receiving the user's selection of the at least one entry from the user contact list comprises:

means for receiving user input selecting the user contact list from the displayed menu; and means for accessing a first storage location in the device to display the user's saved contact entries in response to receiving the user input selecting the user contact list; and means for receiving the user's selection of the at least one entry from the caller identification list comprises:

means for receiving user input selecting the caller identification list from the displayed menu; and means for accessing a second storage location in the device to display received call entries in response to receiving the user input selecting the caller identification list, wherein each received call entry includes at least an originating telephone number;

means for assembling the ad hoc group by combining the selected entries from the plurality of predefined lists; and means for transmitting information on the ad hoc group to the remote server.

17. A non-transitory computer-readable storage medium having stored thereon processor-executable instructions configured to cause a processor of a wireless device with push-to-talk (PTT) communications capability to perform operations comprising:

displaying a menu listing a plurality of predefined lists, wherein each predefined list represents a contact information source separately residing on the wireless device and includes a plurality of entries that can be selected to create an ad hoc PTT group, wherein the plurality of predefined lists includes at least a user contacts list and a caller identification list;

receiving a user's selection of entries from the plurality of predefined lists, including at least one entry from the user contacts list and at least one entry from the caller identification list, wherein:

receiving the user's selection of the at least one entry from the user contact list comprises:

receiving user input selecting the user contact list from the displayed menu; and accessing a first storage location in the wireless device to display the user's saved contact entries in response to receiving the user input selecting the user contact list; and receiving the user's selection of the at least one entry from the caller identification list comprises:

receiving user input selecting the caller identification list from the displayed menu; and accessing a second storage location in the wireless device to display received call entries in response to receiving the user input selecting the caller identification list, wherein each received call entry comprises at least an originating telephone number;

composing the ad hoc PTT group using the selected entries from the plurality of predefined lists; and transmitting information on the ad hoc PTT group to a server.

18. The non-transitory computer-readable storage medium of claim 17, wherein the stored processor-executable instructions are configured to cause a processor of the wireless device with PTT communications capability to perform operations such that transmitting information on the ad hoc PTT group to a server comprises transmitting the information to the server via a PTT communication channel.

19. A non-transitory computer-readable storage medium having stored thereon processor-executable instructions configured to cause a processor of a push-to-talk (PTT) communication server to perform operations comprising:

receiving a PTT request from a wireless device through a PTT communication channel;

receiving group information defining a PTT group from the wireless device, wherein the group information identifies entries selected from a plurality of predefined lists, wherein each predefined list represents a contact information source separately residing on the wireless device, and wherein the plurality of predefined lists includes:

a user contacts list comprising contact entries saved by a user and stored in a first storage location on the wireless device; and a caller identification list comprising received call entries stored in a second location on the wireless device, wherein each received call entry includes at least an originating telephone number;

establishing the PTT group by combining the received group information, wherein the received group information identifies at least one entry selected from the user contact list and at least one entry selected from the caller identification list;

receiving PTT audio data from the wireless device; and distributing the PTT audio data to a plurality of members listed in the PTT group, wherein the plurality of members correspond to the selected entries identified in the received group information.

20. A system for forming an ad hoc group for a push-to-talk (PTT) communication in a wireless communications network, comprising:

a server in communication with the wireless communication network, the server capable of receiving information of an ad hoc group and establishing the ad hoc group for a PTT communication; and a plurality of wireless communication devices capable of communicating with the server through the wireless communications network, wherein each wireless communication device is capable of:

displaying a menu listing a plurality of predefined lists, wherein each predefined list represents a contact information source separately residing on that wireless communication device and includes a plurality of entries that are selectable to add to the ad hoc group, wherein the plurality of predefined lists includes at least a user contact list and a caller identification list, receiving a user's selection of entries from the plurality of predefined lists on that wireless communication device, including at least one entry from the user contact list and at least one entry from the caller identification list, wherein:

receiving the user's selection of the at least one entry from the user contact list comprises:

receiving a user input selecting the user contact list from the displayed menu; and accessing a first storage location on the wireless communication device to display the user's saved contact entries in response to receiving the user input selecting the user contact list; and receiving the user's selection of the at least one entry from the caller identification list comprises:

receiving a user input selecting the caller identification list from the displayed menu; and accessing a second storage location on the wireless communication device to display received call entries in response to receiving the user input selecting the caller identification list, wherein each received call entry comprises at least an originating telephone number;

forming the ad hoc group based on the selected entries from the plurality of predefined lists; and transmitting the information of the ad hoc group to the server through the wireless communications network.

21. The system of claim 20, wherein the at least one of the plurality of predefined lists comprises entries that identify members of a predefined PTT group.

22. The system of claim 20, wherein the at least one of the plurality of predefined lists is a recent call list, wherein the recent call list provides entries corresponding to outgoing calls previously made by the user of the wireless communication device.

23. The method of claim 1, further comprising:

displaying a prompt allowing the user to manually enter contact information to create the ad hoc group;

determining whether the user has selected to manually enter contact information; and receiving user input comprising contact information for at least one member of the ad hoc group in response to determining that the user selected to manually enter contact information, wherein composing the ad hoc group further comprises combining the received user input with the selected entries from the plurality of predefined lists.

24. The apparatus of claim 11, wherein the processor is configured with processor-executable instructions to perform operations further comprising:

displaying a prompt allowing the user to manually enter contact information to create the ad hoc group;

determining whether the user has selected to manually enter contact information; and receiving user input comprising contact information for at least one member of the ad hoc group in response to determining that the user selected to manually enter contact information, wherein composing the ad hoc group further comprises combining the received user input with the selected entries from the plurality of predefined lists.

25. The apparatus of claim 16, further comprising:

means for displaying a prompt allowing the user to manually enter contact information to create the ad hoc group;

means for determining whether the user has selected to manually enter contact information; and means for receiving user input comprising contact information for at least one member of the ad hoc group in response to determining that the user selected to manually enter contact information, wherein means for assembling the ad hoc group further comprises means for combining the received user input with the selected entries from the plurality of predefined lists.

26. The non-transitory computer-readable storage medium of claim 17, wherein the stored processor-executable instructions are configured to cause a processor of the wireless device with PTT communications capability to perform operations further comprising:

displaying a prompt allowing the user to manually enter contact information to create an ad hoc group;

determining whether the user has selected to manually enter contact information; and receiving user input comprising contact information for at least one member of the ad hoc group in response to determining that the user selected to manually enter contact information, wherein composing the ad hoc group further comprises combining the received user input with the selected entries from the plurality of predefined lists.

\* \* \* \* \*